March 28, 1950 S. R. HOWARD 2,502,380
AUTOMATIC WEIGHING AND PACKAGING APPARATUS
Filed Dec. 12, 1947 3 Sheets-Sheet 1
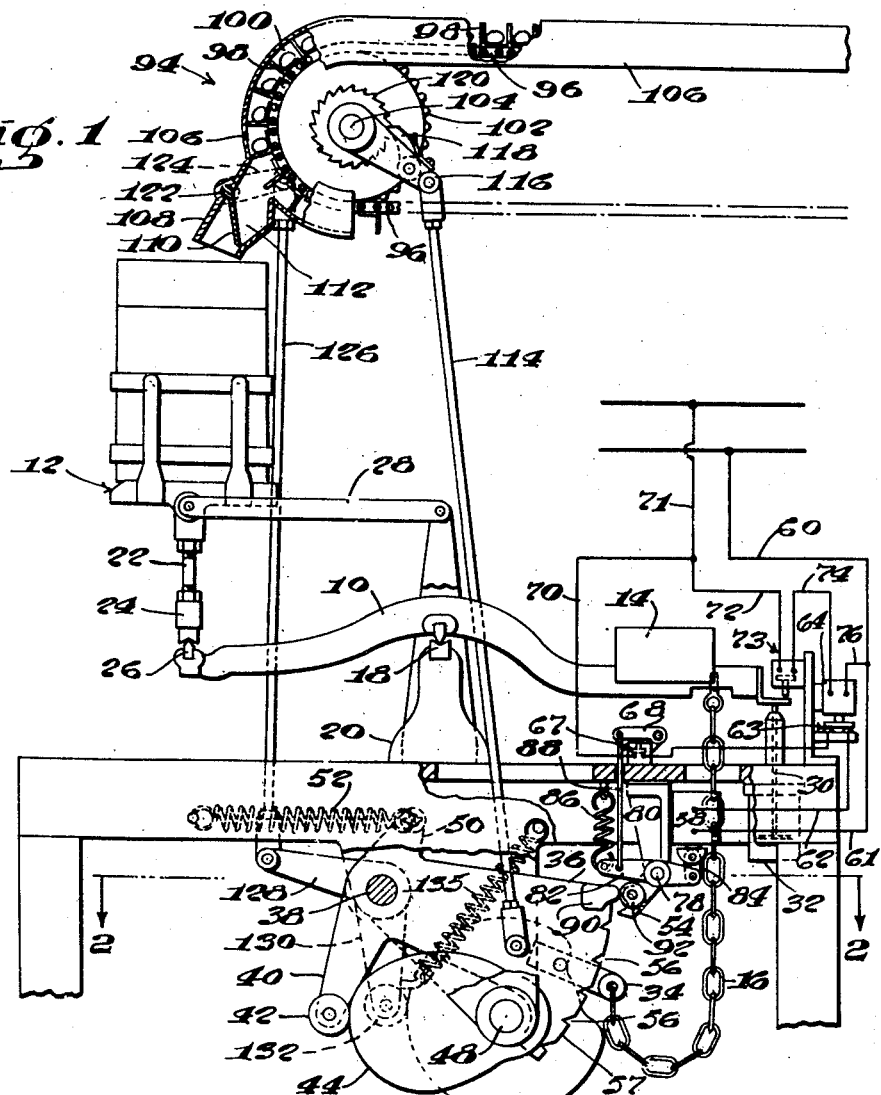
INVENTOR.
Stanley R. Howard.
BY
J. Stanley Churchill
ATTORNEY March 28, 1950  S. R. HOWARD  2,502,380
AUTOMATIC WEIGHING AND PACKAGING APPARATUS
Filed Dec. 12, 1947  3 Sheets-Sheet 2

INVENTOR.
Stanley R. Howard

BY J. Stanley Churchill
ATTORNEY

INVENTOR.
Stanley R. Howard
BY J. Stanley Churchill
ATTORNEY

Patented Mar. 28, 1950

2,502,380

UNITED STATES PATENT OFFICE 2,502,380

AUTOMATIC WEIGHING AND PACKAGING APPARATUS

Stanley R. Howard, Milton, Mass., assignor to Pneumatic Scale Corporation, Limited, Quincy, Mass., a corporation of Massachusetts Application December 12, 1947, Serial No. 791,397

11 Claims. (Cl. 249—61)

This invention relates to novel apparatus for packaging.

One object of the invention is to provide a novel apparatus for packaging, by which packages having weights within allowable tolerances may be produced in a novel, efficient and simplified manner.

Another object of the invention is to provide a novel apparatus for first producing a partial load, preferably by partially filling a package, then determining the deviation of the weight thereof from a predetermined weight and then adding to the partial load thus weighed, the requisite material to produce a final load having a weight within allowable tolerances from a predetermined weight.

A further object of the invention is to provide a novel and improved packaging machine having novel provision for check weighing a partially filled package and having material feeding and accumulating means controlled by the check weighing means for accumulating additional increments of material, to be subsequently introduced into the package in an amount sufficient to bring the package up to a predetermined weight within allowable tolerances.

With these general objects in view, and such others as may hereinafter appear, the invention consists in the packaging machine and in the various structures, arrangements and combinations of parts hereinafter described and particularly defined in the claims at the end of this specification.

Figure 3:
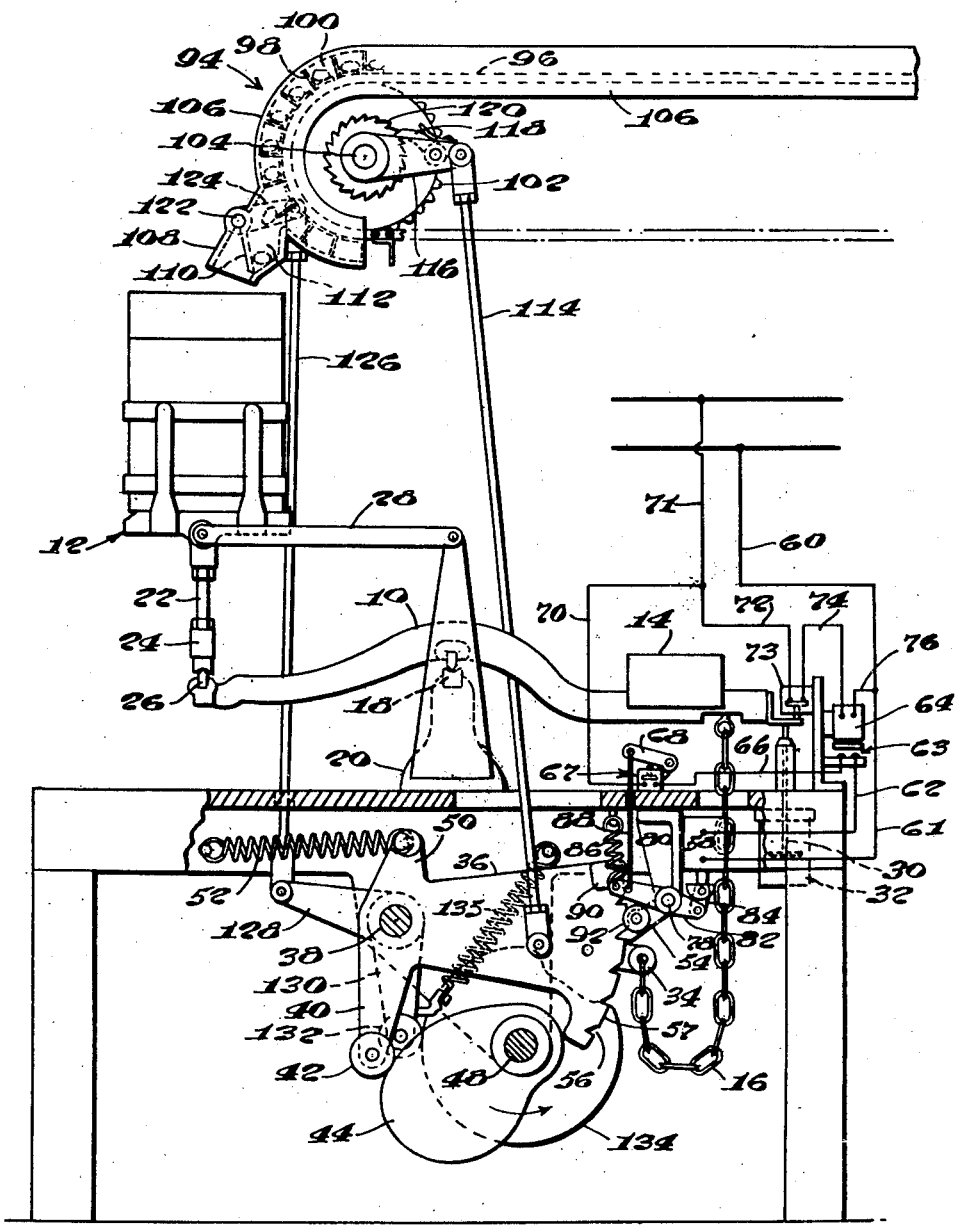
Figure 4:
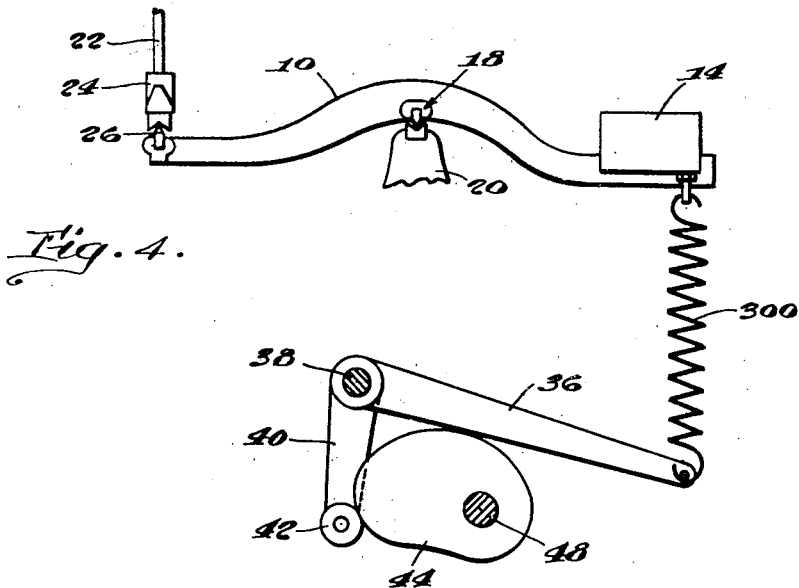
Figure 5:
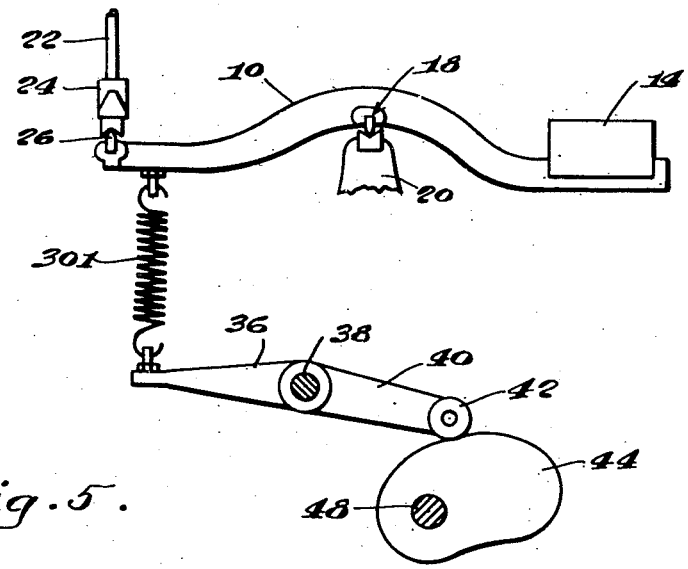

In the drawings illustrating the preferred embodiment of the invention, Fig. 1 is a side elevation of a packaging machine embodying the present invention; Fig. 2 is a cross sectional plan view, the section being taken on the line 2—2 of Fig. 1; and Fig. 3 is a view similar to Fig. 1 with the parts shown in a different position of operation, and Figs. 4 and 5 are details to be referred to.

The present invention in its broader aspects contemplates a packaging machine, and a method of packaging wherein a partial load is first formed, preferably in a container, and thereafter the same is weighed to determine the deviation thereof from a predetermined weight. Provision is then made for introducing the deficit amount of material to produce a final load or package whose weight is within allowable tolerances of the predetermined weight.

The illustrated embodiment of the invention contemplates a packaging machine having novel and improved check weighing apparatus for checking the weight of partially filled or slightly underweight packages and which is further provided with material feeding and accumulating means controlled by the check weighing mechanism adapted to accumulate additional increments of material in an amount corresponding to the amount the package is found to be underweight as determined by the check weighing apparatus, the accumulated material being subsequently introduced into the package to bring it within allowable tolerances of a predetermined correct weight.

To this end the scale beam of the weighing mechanism is counterweighted so that with the partial load, and as herein shown the underweight package, supported on the weighing end of the beam, the latter is overbalanced. Provision is made for applying a gradually increasing force to the scale beam to effect movement thereof. Provision is also made for terminating the application of such force in response to movement of the scale beam and for utilizing the point of such termination to determine the deviation within allowable tolerances of the weight of the partial load or package from a predetermined amount, and for augmenting the same with the requisite additional material to bring the final weight to a predetermined value within allowable tolerances.

In the illustrated machine, the application of the aforesaid force is produced by reduction of the counterweight although if found desirable other suitable means may be used to accomplish this result.

As herein shown the material increment feeding and accumulating means is operatively connected to and movable with an element of counterweight reducing mechanism, the movement of the latter being related to the feed of successive increments of material in a manner such that a predetermined increment of reduction in counterweight will effect feeding of a predetermined and substantially equal amount of material so that when the scale balances the accumulated material subsequently deposited into the package will be sufficient to bring the package up to its predetermined correct weight within allowable tolerances.

In practice, the load or package to be check weighed may be provided with a partial load in a filling machine having a measuring device or weighing mechanism adjusted to fill the package with a bulk load of a weight within a predetermined limit or tolerance of the correct weight in accordance with the capacity of the check weigher filling mechanism to supply the remainder of the load.

Referring now to the drawings, the check weighing apparatus illustrated therein comprises a scale beam 10 having a scale pan 12 supported at one end thereof; an adjustable counterweight 14 supported at the other end; and a variable counterweight comprising a flexible member, such as a chain 16, suspended from the counterweight end of the scale beam, the lower end of the chain being arranged to be raised during the check weighing operation to gradually and progressively reduce the effective counterweight.

As herein shown, the scale beam 10 is supported by knife edge bearings 18 in a bracket 20 attached to the machine frame. The scale pan 12 is connected to the upper end of a rod 22 which is provided at its lower end with a bar 24 arranged to rest on spaced knife edge bearings 26, one of which is shown, and which are carried by the scale beam 10. Parallel links 28 connected between the machine frame and the scale pan serve to support the latter for vertical movement.

The counterweight end of the scale beam 10 may normally bear against the upper end of a stop rod 30 extending from and operatively connected to a dash pot, indicated generally at 32. In practice, the counterweights, including the adjustable counterweight 14 and the variable counterweight chain 16 are initially adjusted and arranged to overbalance a package approximating the predetermined correct weight, the package being previously filled with a primary or bulk load in an amount slightly less than the predetermined weight.

In operation, when a package to be check weighed is placed on the scale pan, provision is made for gradually lifting the lower end of the chain 16 to progressively reduce the effective counterweight until the scale balances. As shown in the drawings, the lower end of the flexible chain 16 is looped upwardly and hooked into an extension 34 carried by a cam operated counterweight reducing lever 36. The lever 36 is pivotally mounted on a rocker shaft 38 and forms part of a three-armed lever including an arm 40 carrying a roller 42 for cooperation with a cam 44 fast on a cam shaft 48, and an arm 50 connected by a spring 52 arranged to rockingly urge the counterweight reducing lever 36 upwardly or counterclockwise when permitted to do so by the cam 44. The cam shaft 48 may be rotated in any usual or preferred manner, such as by an electric motor, and, the machine may be provided with the usual automatic weighing machine control mechanism, not shown, such as the control mechanism illustrated and described in the United States patent to Howard, No. 2,166,895, issued May 10, 1938, in which the weighing machine is arranged to operate in successive cycles controlled by the operation of the weighing scale. It will thus be seen that during the check weighing operation, the counterweight reducing lever 36 is gradually rocked upwardly to progressively relieve the scale beam of a portion of the weight of the flexible counterweight chain 16, and, when the weight of the package being check weighed overbalances the counterweights, the counterweight end of the scale beam is rocked upwardly.

In the illustrated embodiment of the invention, provision is made for terminating the upward rocking movement of the counterweight reducing lever 36 immediately upon balancing of the scale beam 10 as effected by the reduction of the effective counterweight. As herein shown, termination of the upward rocking movement of the lever 36 is effected by the provision of a solenoid operated pawl 54 arranged to be rocked upon balancing of the scale beam to engage one of a plurality of equally spaced notches 56 formed in a segmental arcuate portion 57 of the lever 36. As illustrated in Fig. 1, the pawl solenoid 58 is normally energized to hold the pawl out of engagement with the segment by an electrical circuit including leads 60, 61 from the main line to the solenoid, a lead 62 from the solenoid to one of a pair of contacts 63 arranged to be normally closed by a relay switch 64, a lead 66 from the second contact 63 to one of a pair of contacts 67 normally closed by a pawl operated switch arm 68, and leads 70, 71 from the second contact 67 of the switch 68 to the main line.

The relay switch 64 forms part of a circuit arranged to be closed upon balancing of the scale beam, and, as herein shown, includes a lead 72 from the lead 71 to a scale operated switch 73, a lead 74 from the scale operated switch to the relay switch 64 and a lead 76 from the relay switch to the main lead 60.

As best shown in Fig. 2, the pawl 54 is mounted fast on a pin 78 rockingly mounted in a bracket 80 attached to the machine frame, and, a two-armed lever 82 fast on the other end of the pin 78 is connected at one end by a link 84 to the armature of the solenoid 58. The second arm of the two-armed lever 82 is connected by a spring 86 arranged to urge the pawl into engagement with the segment 57 when the solenoid 58 is deenergized. The second arm of the two-armed lever 82 is also connected by a link 88 to the switch arm 68 arranged to maintain the pawl solenoid circuit closed at contacts 67 when the pawl is in its inoperative position, as shown in Fig. 1, and to hold the circuit open when the pawl is in its operative position in engagement with a notch 56, as shown in Fig. 3.

From the description thus far it will be seen that when a partially filled or bulk loaded package is placed upon the scale pan 12 and the counterweight reducing lever 36 is rocked upwardly to gradually reduce the effective counterweight, the scale will balance when the counterweight is reduced sufficiently to equal the weighing moment of the package whereupon the scale beam switch 73 will be closed, as shown in Fig. 3, to actuate the relay switch 64, which in turn effects opening of the circuit to the pawl solenoid 58 to deenergize the latter and permit the pawl 54 to engage with a notch 56 thus terminating the movement of the counterweight reducing lever 36. Simultaneously therewith the circuit is opened at contacts 67 to assure that the pawl solenoid will remain deenergized until the end of the weighing cycle and return of the counterweight reducing lever 36 to its original position, shown in Fig. 1. As herein shown, the upper end of the segmental portion of the lever 36 is provided with a cam piece 90 arranged to engage a roller 92 carried by the pawl 54 to effect resetting of the pawl and closing of the circuit at 67 upon the return stroke of the lever 36 to its initial position at the end of the cycle of operation.

In accordance with the present invention, provision is made for feeding and preferably for accumulating successive substantially uniform increments of material during the check weighing operation in an amount proportionate to that which the package is found to be underweight as determined by the extent of arcuate movement of the counterweight reducing lever 36. As herein shown, the feeding and accumulating mechanism, indicated generally at 94 may comprise a chain conveyer 96 having a plurality of spaced upstanding plate members 98 attached thereto forming successive compartments 100 in which successive increments of material are carried. The chain 96 is arranged to pass around a sprocket 102 fast on a shaft 104, and the upper run of the conveyer and a portion of the chain passing around the sprocket is preferably enclosed, as indicated, to form a conduit 106 extending about one half way around the sprocket.

As herein shown, the arcuate portion of the conduit extending about the sprocket 102 is provided at its lower end with an outlet in the form of a spout or funnel 108 directed toward the open mouth of the package supported on the scale pan 12, the funnel being arranged to receive the contents of successive compartments 100 when the feeding mechanism is operated. The funnel 108 is further provided with a shutter 110 arranged to be closed during the check weighing operation to form an accumulating chamber 112 in which successive increments of material are deposited during the check weighing operation.

Provision is made for rotating the sprocket 102 during the check weighing operation to effect accumulation of successive increments in an amount sufficient to make up the full weight of the partially filled package, as determined by the check weighing mechanism, the rotation being effected by a direct connection to the counterweight reducing lever 36, and, as herein shown, the lever 36 is connected by a link 114 to a pawl carrier arm 116 loosely mounted on the sprocket shaft 104. The pawl arm 116 is provided with a spring pressed pawl 118 arranged to cooperate with a ratchet 120 fast on the shaft 104.

In practice, each compartment 100 is provided with a substantially uniform increment of material which may comprise individual portions of the material being weighed, the illustrated embodiment of the invention being designed to feed substantially uniform sized prunes, and, the compartments may be spaced with relation to the space between successive notches 56 in the segmental portion 57 so that arcuate movement of the counterweight reducing lever 36 through a distance of one notch is effective to move the chain conveyer a distance of one compartment, through the pawl and ratchet linkage described, to deposit one increment of material into the accumulating chamber. Thus, in operation, if the counterweight reducing lever 36 passes through an arcuate distance of two notches before the scale balances in response to a proportionate reduction in counterweight, the feeding device 94 will deposit two prunes into the accumulating chamber 112, as illustrated in Fig. 3.

Provision is further made for releasing the accumulated increments in the chamber 112 at the end of the check weighing and material accumulating operation, and, as herein shown, the shutter 110 is fast on a shaft 122 rockingly supported in the funnel 108 and having an arm 124 connected by a link 126 to an arm 128 fast on the rocker shaft 38. A second arm 130, also fast on the rocker shaft 38 is provided with a roller 132 arranged to cooperate with a cam 134 fast on the cam shaft 48. The cam 134 is designed to rock the shutter 110 to its open position near the end of the cycle of operation, after a sufficient time has elapsed to complete the check weighing and material accumulating operation, and, to thereafter reset the shutter to its closed position in readiness for a succeeding cycle of operation. The roller 132 is held in engagement with its cam 134 by a spring 135.

From the above description of the preferred embodiment of the invention, it will be observed that the present check weighing mechanism, operatively connected to a material feeding and accumulating device, is capable of check weighing a partially filled package and effecting feeding and accumulation of a sufficient number of additional increments during the check weighing operation to make up the full weight of the package, the feeding of the material being directly proportionate to the reduction in effective counterweight as effected by the movement of the counterweight reducing member. While the illustrated machine is designed, by way of example, for handling individual substantially uniform lumpy pieces, such as prunes, it will be apparent that the invention may be used with advantage for other types of materials such as free flowing finely divided materials, uniform increments of which may be placed in successive compartments by hand or by suitable weighing or measuring devices.

In addition to the reduction in effective counterweight, other suitable means may be employed for effecting the application of a gradually increasing force to the scale beam to cause movement thereof from its overbalanced position.

As shown in detail in Fig. 4 the counterweight end of the beam may be connected by a spring 300 to the counterweight reducing lever 36, or as shown in Fig. 5 the lever 36 may be extended beyond its pivot and connected at its extended end to the weighing end of the scale beam by a spring 301. Either spring may serve instead of the flexible chain 16 to accomplish the result.

As will be evident from the foregoing descriptions, the removal of a portion of the counterweight from the scale beam is considered to constitute the application of a force to the scale beam and reference in the claims to such application of force is intended to include such removal of counterweight.

While the preferred embodiment of the invention has been herein illustrated and described, it will be understood that the invention may be embodied in other forms within the scope of the following claims.

Having thus described the invention, what is claimed is:

1. In a packaging machine, in combination, a scale beam arranged to support a partially filled package with the beam in an initially overbalanced position, means including a movable member for applying to the scale beam a gradually increasing force to effect balancing movement of the beam, means responsive to the movement of the movable member for predetermining a quantity of material to be fed into the package in an amount proportionate to the force required to substantially balance the scale beam, and means operable in response to balancing of the beam to feed said quantity of material to the package.

2. In a packaging machine, in combination, a scale beam arranged to assume an initially overbalanced position with a partial load supported upon the weighing end of the beam, movable means for applying a gradually increasing force to the scale beam to effect balancing movement thereof, and material measuring means responsive to and controlled by the movement of said force applying means to measure a quantity of material proportional to the movement of said movable means, said quantity being that necessary to complete said partial load.

3. In a packaging machine, in combination, weighing mechanism comprising a scale beam, counterweight means for said scale beam sufficient to initially overbalance a partially filled and underweight package, movable means for reducing the counterweight means to effect balancing of the scale beam, material measuring means responsive to the extent of movement of said counterweight reducing means for measuring material in an amount proportionate to the extent of movement of said counterweight reducing means and means for feeding said measured quantity to said package upon balancing of said beam.

4. In a packaging machine, in combination, a scale beam arranged to support a partially filled package with the beam in an initially overbalanced position, movable means for applying to the scale beam a gradually increasing counterweight reducing force to effect balancing movement of the beam, and material feeding and accumulating means responsive to the movement of the counterweight reducing means for feeding and accumulating material in an amount proportionate to said reduction in counterweight, whereby to provide an additional amount of material sufficient to bring the package up to a predetermined weight.

5. In a packaging machine, in combination, a scale beam arranged to assume an initially overbalanced position with a partial load supported upon the weighing end of the beam, movable means for applying a gradually increasing force to the scale beam to effect balancing movement thereof, material feeding and accumulating means responsive to and controlled by the movement of said force applying means, and means for releasing the accumulated material into the package at the end of the weighing operation.

6. In a packaging machine, in combination, weighing mechanism comprising a scale beam, a counterweight for said scale beam including a flexible member suspended therefrom and initially arranged to overbalance a partially filled and underweight package, means for gradually lifting the depending end of said flexible counterweight to reduce the effective counterweight and effect balancing movement of the scale beam, and material measuring means responsive to the progressive movement of said counterweight reducing means for measuring material in an amount proportionate to the reduction in effective counterweight.

7. In a packaging machine, in combination, weighing mechanism comprising a scale beam, a counterweight for said scale beam including a flexible member suspended therefrom and initially arranged to overbalance a partially filled and underweight package, means for gradually lifting the depending end of said flexible counterweight to reduce the effective counterweight and effect balancing movement of the scale beam, and material measuring means responsive to the progressive movement of said counterweight reducing means having provision for accumulating successive substantially uniform increments of material in an amount proportionate to the reduction in effective counterweight.

8. In a packaging machine, in combination, check weighing mechanism comprising a scale beam, counterweight means for said scale beam sufficient to initially overbalance a partially filled and underweight package, means for gradually reducing the counterweight means to effect movement of the scale beam, means responsive to the movement of the scale beam to effect termination of the operation of said counterweight reducing means, material feeding means having an accumulating chamber associated therewith, and means operatively connecting said counterweight reducing means and said feeding means adapted to effect feeding of material into the accumulating chamber during the check weighing operation in an amount proportionate to the reduction of said counterweight means whereby to provide an accumulation of material in an amount sufficient to bring the package up to a predetermined correct weight when the accumulated material is subsequently introduced into the package.

9. In a packaging machine, in combination, check weighing means comprising a scale beam, a variable counterweight comprising a flexible member suspended from the counterweight end of the scale beam and initially arranged to overbalance a partially filled and underweight package, means for gradually and progressively reducing the effective counterweight during the check weighing operation to effect movement of the scale beam including means for lifting the suspended end of said flexible member, means responsive to the movement of the scale beam adapted to effect termination of said counterweight reducing means, material feeding means having an accumulating chamber associated therewith, and means operatively connecting said counterweight reducing means and said feeding means adapted to effect feeding of material into said accumulating chamber during the check weighing operation in an amount proportionate to the reduction of said counterweight whereby to provide an accumulation of material sufficient to bring the package up to a predetermined weight when the accumulated material is subsequently introduced into the package.

10. In a packaging machine, in combination, check weighing means comprising a scale beam, a variable counterweight comprising a flexible member suspended from the counterweight end of the scale beam and initially arranged to overbalance a partially filled and underweight package, means for gradually and progressively reducing the effective counterweight during the check weighing operation to effect movement of the scale beam including means for lifting the suspended end of said flexible member, means responsive to the movement of the scale beam adapted to effect termination of said counterweight reducing means, material feeding means having an accumulating chamber associated therewith, and having provision for feeding material in successive substantially uniform increments, and means operatively connecting said counterweight reducing means and said feeding means adapted to effect feeding of successive increments of material into said accumulating chamber during the check weighing operation in an amount proportionate to the reduction of said counterweight whereby to provide an accumulation of material sufficient to bring the package up to a predetermined weight when the accumulated material is subsequently introduced into the package.

11. In a packaging machine, in combination, weighing mechanism comprising a scale beam, a counterweight for said scale beam initially arranged to overbalance a partially filled and underweight package, means for applying a gradually increasing counterweight reducing force to the beam including a cam operated lever for effecting movement of the scale beam, material feeding means operatively connected to said lever having an accumulating chamber associated therewith, said feeding means being adapted to feed successive substantially uniform increments of material into said chamber during the weighing operation in an amount proportionate to the force thus applied, and control means including a segmental ratchet carried by and movable with said cam operated lever, and a solenoid operated pawl responsive to the movement of the scale beam and engageable with said segmental ratchet for terminating the operation of said counterweight reducing force-applying means and discontinuing the feed of said material whereby to provide an accumulation of material in an amount sufficient to bring the package up to a predetermined correct weight when the accumulated material is subsequently introduced into the package.

STANLEY R. HOWARD.

REFERENCES CITED

The following references are of record in the file of this patent:

UNITED STATES PATENTS

| Number | Name | Date |
| --- | --- | --- |
| 1,262,256 | Redd | Apr. 9, 1918 |
| 2,258,182 | Howard | Oct. 7, 1941 |